Figure 1:
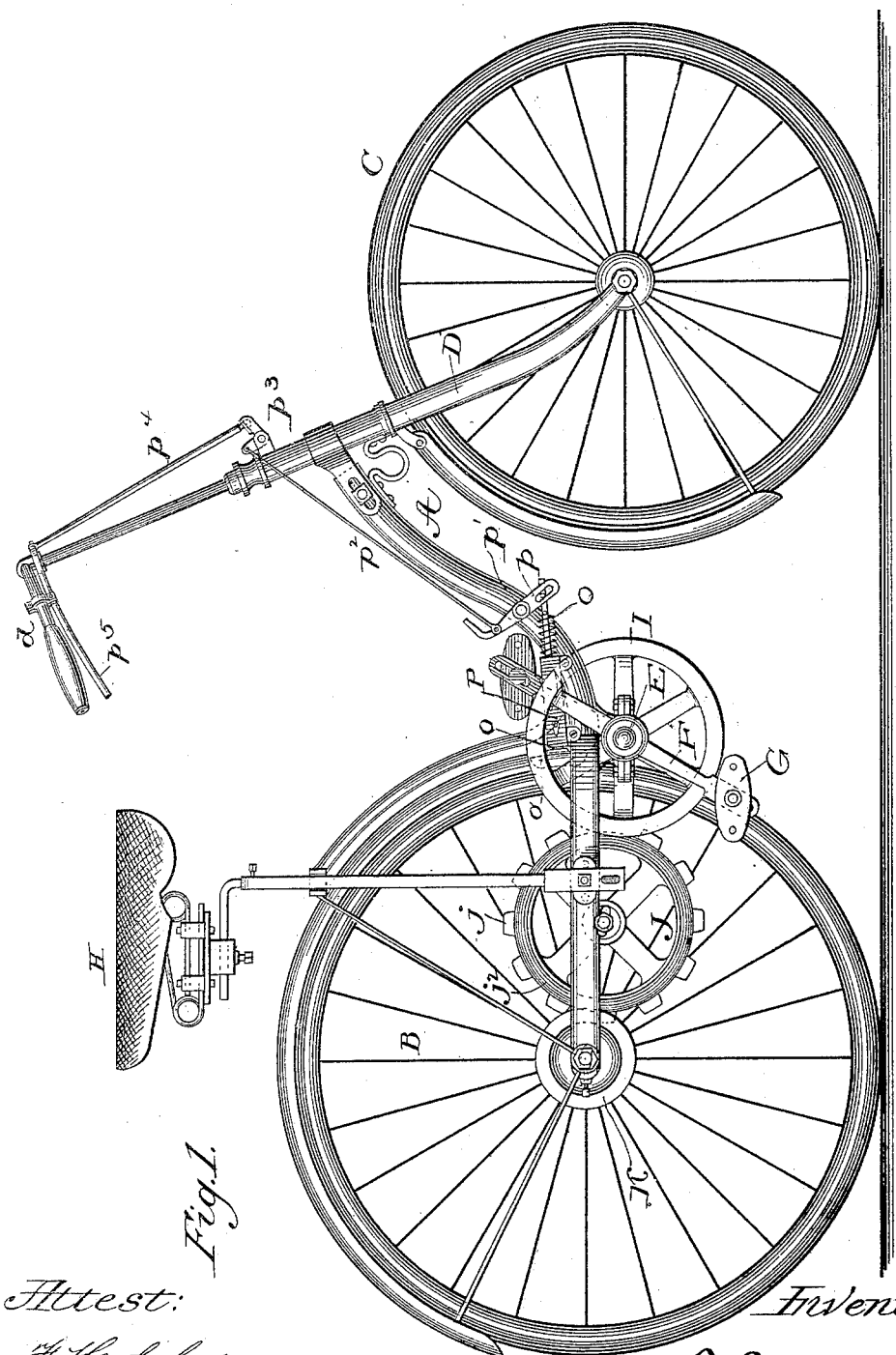

(No Model.) 2 Sheets—Sheet 1.

F. B. HUNT.
BICYCLE.

No. 450,938. Patented Apr. 21, 1891.

Attest:
F. H. Schott
Fabius Stanly Elmore

Inventor
F. B. Hunt
By Phil. T. Dodge
atty

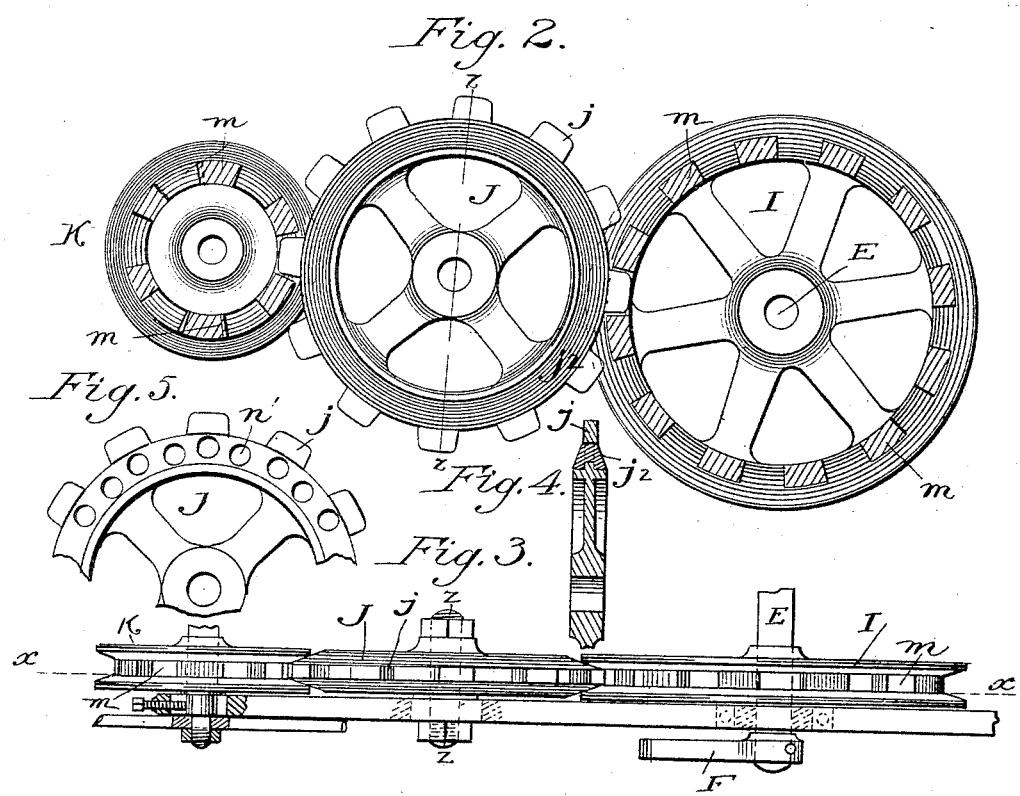

UNITED STATES PATENT OFFICE.

FRANKLIN B. HUNT, OF RICHMOND, INDIANA, ASSIGNOR OF ONE-HALF TO
L. C. ALLEN, OF WASHINGTON, DISTRICT OF COLUMBIA.

BICYCLE.

SPECIFICATION forming part of Letters Patent No. 450,938, dated April 21, 1891.

Application filed January 29, 1891. Serial No. 379,512. (No model.)

*To all whom it may concern:*

Be it known that I, FRANKLIN B. HUNT, of Richmond, in the county of Wayne and State of Indiana, have invented certain Improvements in Bicycles, of which the following is a specification.

My invention has reference to improvements in the driving-gear of bicycles.

The first improvement, which is applicable to machines of various forms, is intended more particularly for use in what are known as "rear-driven Safety bicycles," and I have therefore illustrated the same in this connection.

The improvement consists of driving-wheels which are provided with co-operating friction-surfaces, and also with co-operating teeth, by which they are adapted to run in a smooth and noiseless manner and to combine the good qualities and advantages of both friction and spur gear.

In the accompanying drawings, Figure 1 is a side elevation of a bicycle having my improvements embodied therein. Fig. 2 is a longitudinal vertical section through the gear-train on the line $x$ $x$ of Fig. 3. Fig. 3 is a top plan view of the gear-train. Fig. 4 is a central axial section through the intermediate wheel of the train on the line $z$ $z$ of Figs. 2 and 3. Fig. 5 is a side view of the same wheel with the frictional surface removed.

Referring to the drawings, A represents a frame or reach; B, the rear driving-wheel mounted in the forked end of the reach; C, the front steering-wheel, and D the steering-fork carrying the front wheel and connected to the front of the reach by a substantially vertical axis, so that it may be turned to the right and left by means of its steering-handle $d$ in order to determine the course of the machine.

The foregoing parts may all be constructed in any ordinary or appropriate manner.

E represents the horizontal driving-shaft mounted in bearings on the reach immediately in front of the rear wheel and provided at its ends with cranks F, carrying pedals G, through which the power for propelling the machine is applied by the foot of the operator occupying the elevated seat, as usual. The pedal-shaft is provided at one end with a wheel I, which communicates motion through a wheel J, mounted in a bearing on the reach, to the wheel K, secured to the axle of the driving-wheel B.

The first part of my invention relates to the pecular construction of the driving-train I, J, and K. As shown in Figs. 2, 3, and 4, the outside wheels I and K are constructed each with a peripheral groove or channel of V form therein and with a series of openings or sockets $m$ from the bottom of the groove or channel through the internal surface of the rim. The intermediate wheel J is formed with a series of peripheral teeth $j$, adapted to enter the sockets or openings of the other wheels, as plainly shown in Fig. 2, so that motion is by means of the teeth imparted positively from the wheel I to the wheel J and from the latter to wheel K. The teeth $j$ may have their active edges of the same form or curvature as those of ordinary spur driving-gear, and the walls of the sockets in which they engage are to be correspondingly shaped, in order to reduce the wear between the bearing-surfaces as much as possible.

In addition to its driving-teeth, the wheel J is provided near the outer edge with an annular body $j^2$, of rubber, rawhide, or other suitable material. The opposite faces of this friction-ring are beveled or chamfered, so that it fits snugly within the grooves of the adjacent walls and bears with considerable frictional contact against the converging walls of said grooves. The frictional contact thus secured between the wheels is sufficient to alone propel the machine under ordinary circumstances, and it serves not only to prevent noise and to cause a smooth and easy action of the wheels one upon the other, but also to relieve the teeth from a great portion of the wear which they would otherwise receive.

The frictional portion of the wheel may be applied thereto in any suitable manner; but I find in practice that it is advisable to employ vulcanized rubber and to secure the same in place by providing the wheel with perforations $n$, as shown in Fig. 5, in molding the rubber in place upon the wheel and through the openings, as plainly shown in Fig. 4. As the sockets to receive the teeth $j$ open through to the interior of the wheels, there is no danger of obstructive matters lodging therein.

The essence of my invention as regards the driving-gear consists in adapting them to engage both frictionally and positively, and it is to be understood that the details of construction may be modified provided only one wheel is adapted to engage frictionally within the groove of another and the two adapted to interlock positively. It will of course be understood that those portions of the wheels I and K which lie between the receiving-sockets $m$ are in effect teeth.

Having thus described my invention, what I claim is—

1. In a bicycle, the combination of the driving-wheel, the peripherally grooved and mortised wheel attached thereto, the pedal-shaft, the peripherally grooved and mortised wheel attached thereto, and the intermediate wheel provided with the friction-surfaces and teeth to engage the other wheels, substantially as described.

2. In a driving-gear for bicycles and kindred machines, a wheel having a peripheral groove and a series of sockets or indentations at the bottom of said groove, in combination with a second wheel having its periphery adapted to enter said groove, and having, also, peripheral teeth to enter the sockets of the first wheel, whereby the one wheel is enabled to drive the other in part through the frictional action of the surfaces and in part through the positive engagement of the teeth.

3. In a driving-gear for bicycles and kindred machines, the wheel having peripheral teeth, the transverse perforations, and the elastic frictional material extended through said perforations and exposed in annular lines on opposite sides of the wheel, in combination with the co-operating wheel having the V-shaped groove to embrace the friction-surfaces and the sockets to receive the teeth.

In testimony whereof I hereunto set my hand, this 29th day of January, 1891, in the presence of two attesting witnesses.

FRANKLIN B. HUNT.

Witnesses:
W. R. KENNEDY,
FABIUS STANLY ELMORE.